(12) United States Patent
Estep et al.

(10) Patent No.: US 12,340,125 B2
(45) Date of Patent: Jun. 24, 2025

(54) READ REPLACEMENT VIA DATA RECONSTRUCTION BASED ON ACCESS PATTERNS

(71) Applicant: Micron Technology, Inc., Boise, ID (US)

(72) Inventors: Patrick Estep, Rowlett, TX (US); Sean S. Eilert, Penryn, CA (US); Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/531,267

(22) Filed: Dec. 6, 2023

(65) Prior Publication Data
US 2024/0192892 A1   Jun. 13, 2024

Related U.S. Application Data

(60) Provisional application No. 63/430,714, filed on Dec. 7, 2022.

(51) Int. Cl.
*G06F 3/00* (2006.01)
*G06F 3/06* (2006.01)
*G06F 11/00* (2006.01)
*G06F 11/10* (2006.01)

(52) U.S. Cl.
CPC .......... *G06F 3/0659* (2013.01); *G06F 3/0604* (2013.01); *G06F 3/0689* (2013.01); *G06F 11/1088* (2013.01)

(58) Field of Classification Search
CPC ... G06F 3/0659; G06F 3/0689; G06F 11/1088
See application file for complete search history.

(56) References Cited

U.S. PATENT DOCUMENTS

| | | | |
|---|---|---|---|
| 11,409,601 B1 | 8/2022 | Brewer et al. | |
| 2017/0075622 A1* | 3/2017 | Kwon | G06F 3/0613 |

* cited by examiner

*Primary Examiner* — Reginald G Bragdon
*Assistant Examiner* — Michael L Westbrook
(74) *Attorney, Agent, or Firm* — Brooks, Cameron & Huebsch, PLLC (57) ABSTRACT

Systems, apparatuses, and methods related to data reconstruction based on queue depth comparison are described. To avoid accessing the "congested" channel, a read command to access the "congested" channel can be executed by accessing the other relatively "idle" channels and utilize data read from the "idle" channels to reconstruct data corresponding to the read command.

25 Claims, 4 Drawing Sheets

440—

RECEIVING A READ COMMAND TO ACCESS DATA STORED IN A MEMORY DEVICE CORRESPONDING TO A FIRST CHANNEL OF A PLURALITY OF CHANNELS —442

EXECUTING, RESPONSIVE TO A QUEUE DEPTH OF A FIRST COMMAND QUEUE CORRESPONDING TO THE FIRST CHANNEL BEING GREATER THAN A RESPECTIVE QUEUE DEPTH OF EACH ONE OF A NUMBER OF SECOND COMMAND QUEUES CORRESPONDING TO SECOND CHANNELS OF THE PLURALITY OF CHANNELS AT LEAST BY A THRESHOLD AMOUNT, THE READ COMMAND BY RECONSTRUCTING THE DATA CORRESPONDING TO THE READ COMMAND USING DATA STORED IN MEMORY DEVICES CORRESPONDING TO THE SECOND CHANNELS —444

READ REPLACEMENT VIA DATA RECONSTRUCTION BASED ON ACCESS PATTERNS

PRIORITY INFORMATION

This application claims the benefit of U.S. Provisional Application No. 63/430,714, filed on Dec. 7, 2022, the contents of which is incorporated herein by reference.

TECHNICAL FIELD

The present disclosure relates generally to semiconductor memory and methods, and more particularly, to apparatuses, systems, and methods for read replacement via data reconstruction based on access patterns.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (ReRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to read replacement via data reconstruction based on access patterns are described. Embodiments described herein are directed to providing an alternative mechanism to access (e.g., read) data corresponding to a relatively "congested" channel (e.g., data stored in a memory device coupled to a "congested" channel). For example, to execute a read command to access data stored on a memory device coupled to a channel determined to be "congested," embodiments of the present disclosure can instead read data from memory devices coupled to the other relatively less congested (e.g., "idle") channels to reconstruct the data rather than accessing the "congested" channel. In this manner, a read operation can effectively be replaced with a data reconstruction operation. As described further herein, the reconstruction operation can be similar to a "Redundant Array of Independent Disks" (RAID) scheme (e.g., a RAID 5 scheme). By utilizing the "idle" channels instead of the "congested" channel, negative and undesired impacts on the memory system due to non-uniform access patterns over the channels (e.g., the patterns that disproportionately targeting a single channel of the memory system) can be mitigated and/or avoided; thereby, achieving and/or improving channel parallelism.

In reconstructing the data, various embodiments of the present disclosure can utilize a scheme associated with a memory system Reliability, Availability, and Serviceability (RAS) solution. Various RAS mechanisms can enable the memory system to work properly even if a constituent component, such as a memory die, chip, or a package (e.g., a group of memory dice), is not functional (e.g., damaged); thereby avoiding a situation of one of the components being a single point of failure (SPOF) of the memory system. Therefore, some RAS solutions can be referred to as "chip kill" mechanisms and can be employed through various error correction code (ECC) schemes including a RAID scheme, a low-power chip kill (LPCK) scheme, etc., which allow data recovery of the damaged component by reading the other constituent components of the memory system. In some embodiments, the RAID scheme can be utilized to replace a read operation by instead reconstructing the data, which would have been obtained by accessing a "congested" channel, by reading the other channels.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 125-1, 125-N in FIG. 1. Such analogous elements may be generally referenced without the hyphen and extra numeral or letter. For example, elements 125-1, 125-N may be collectively referenced as elements 102. As used herein, the designators "N" and "Q", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
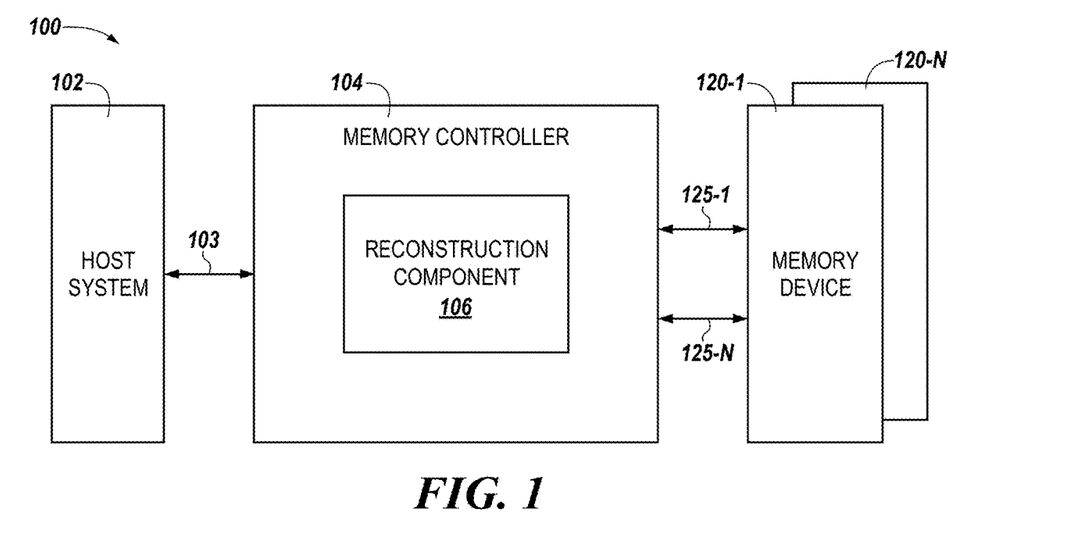
FIG. 1 is a block diagram in the form of a computing system including a host, a memory controller, and memory devices in accordance with a number of embodiments of the present disclosure.

FIG. 1 is a block diagram in the form of a computing system 100 including a host 102, a memory controller 104, and memory devices 120-1, . . . , 120-N in accordance with a number of embodiments of the present disclosure. As used herein, a host system 102, a memory controller 104, and/or memory devices 120-1, . . . , 120-N might also be separately considered an "apparatus."

The host 102 can include host memory and a central processing unit (not illustrated). The host 102 can be a host system such as a personal laptop computer, a desktop computer, a digital camera, a smart phone, a memory card reader, and/or internet-of-thing enabled device, among various other types of hosts, and can include a memory access device (e.g., a processor and/or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or the host 102, the memory controller 104, and the memory devices 120 can be on the same integrated circuit. The system 100 can be, for instance, a server system and/or a high-performance computing (HPC) system and/or a portion thereof.

As illustrated in FIG. 1, a host 102 can be coupled to the memory controller 104 via an interface 103. The interface 103 can be any type of communication path, bus, or the like that allows for information to be transferred between the host 102 and the memory controller 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can include a flexible bus interconnect and use CXL protocol layers including CXL.io and CXL.mem and can support transfer speeds of at least 32 gigatransfers per second.

The memory controller 104 can control performance of a memory operation for an access command received from the host 102. The memory operation can be a memory operation to read data (in response to a read request from the host) from or an operation to write data (in response to a write request from the host) to one or more memory devices 120. As further illustrated in described in connection with FIG. 2, the memory controller 104 can further include media controllers (e.g., the media controllers 221 illustrated in FIG. 2) each configured to control performance of a memory operation directed to a corresponding channel and/or memory device 120.

In some embodiments, the memory controller 104 can be a compute express link (CXL) compliant memory controller. The host interface (e.g., the front end portion of the memory controller 104) can be managed with CXL protocols and be coupled to the host 102 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The memory controller 104 can be coupled to the memory devices 120 via channels 125. The channels 125 can include various types data buses, such as a sixteen-pin data bus and a two-pin data mask inversion (DMI) bus, among other possible buses. In some embodiments, the channels 125 can be part of a physical (PHY) layer. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium.

The memory device(s) 120 can provide main memory for the computing system 100 or could be used as additional memory or storage throughout the computing system 100. The memory devices 120 can be various/different types of memory devices. For instance, the memory device can include RAM, ROM, DRAM, SDRAM, PCRAM, RRAM, and flash memory, among others. In embodiments in which the memory device 120 includes persistent or non-volatile memory, the memory device 120 can be flash memory devices such as NAND or NOR flash memory devices. Embodiments are not so limited, however, and the memory device 120 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a memory device with resistive, phase-change, or similar memory cells, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, an array of non-volatile memory cells, such as resistive, phase-change, or similar memory cells, can perform bit storage based on a change of bulk resistance, in conjunction with a stackable cross-gridded data access array. Additionally, in contrast to many flash-based memories, the non-volatile memory can perform a write in-place operation, where a non-volatile memory cell can be programmed without the non-volatile memory cell being previously erased.

One example of the memory devices 120 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 120-1 is operated as an LPDDRx DRAM device with low-power features enabled and at least one of the memory devices 120-N is operated an LPDDRx DRAM device with at least one low-power feature disabled. In some embodiments, although the memory devices 120 are LPDDRx memory devices, the memory devices 120 do not include circuitry configured to provide low-power functionality for the memory devices 120 such as a dynamic voltage frequency scaling core (DVFSC), a sub-threshold current reduce circuit (SCRC), or other low-power functionality providing circuitry. Providing the LPDDRx memory devices 120 without such circuitry can advantageously reduce the cost, size, and/or complexity of the LPDDRx memory devices 120. By way of example, an LPDDRx memory device 120 with reduced low-power functionality providing circuitry can be used for applications other than mobile applications (e.g., if the memory is not intended to be used in a mobile application, some or all low-power functionality may be sacrificed for a reduction in the cost of producing the memory).

The memory devices 120 can each comprise a number of dice that can be grouped into a number of ranks (e.g., four ranks) across the different channels. As used herein, the term "ranks" generally refers to a plurality of memory chips (e.g., memory dice) that can be accessed simultaneously. In some embodiments, the channel 125 may have a sixteen (16)-bit data bus. If there are four 16-bit memory chips (e.g., each including one or more memory dice) connected to the channel 125, each memory chip may correspond to a memory rank. In these embodiments, there may be four (4) memory ranks. In some embodiments, the four memory chips may be eight (8)-bit memory chips instead of 16-bit memory chips. In these embodiments, two memory chips may be combined to form a 16-bit channel and result in the four memory chips forming two memory ranks. Read and write commands may not be executed concurrently in different memory ranks because the read commands and the write commands may use the data channel which is shared in a multi-rank memory topology.

The memory controller 104 can further include reconstruction component 106. Although not shown in FIG. 1 so as to not obfuscate the drawings, the reconstruction component 106 can include various circuitry to facilitate performance of operations described herein. For example, the reconstruction component 106 can perform operations associated with monitoring traffic of (e.g., queue depths of command queues respectively corresponding to) the channels 125, generating parity (e.g., RAID parity) based on user data received from the host (e.g., the host 102 illustrated in FIG. 1), and/or performing a RAID operation using data (e.g., user and parity data) transferred from the memory devices 120. As used herein, "queue depth" refers to the quantity of entries (e.g., commands) in a particular queue as opposed to the size of the queue (e.g., total quantity of entries the queue is capable of holding).

The reconstruction component 106 can reconstruct data stored in one of the memory devices 120. To reconstruct data, the reconstruction component 106 can be configured to perform a chip kill operation, such as a RAID operation. For example, a RAID process is triggered, the reconstruction component 106 can cause the memory devices 120 to transfer (e.g., read) data corresponding to a same stripe as data to be reconstructed. As used herein, the term "stripe" refers to a unit of RAID access. The stripe can consist of one or more subsets of parity data and subsets of user data that are used to generate the subsets of parity data. In order to recover and/or reconstruct one subset of data (e.g., user data or parity data), the other subsets of data can be transferred to the reconstruction component 106 from the memory device 120, in which the other subsets of data are XORed to reconstruct the one subset of data.

The RAID process can be triggered due to various reasons. In one example, data can be reconstructed to recover user data having errors (e.g., user data stored on a damaged chip, such as a memory die or memory device). For example, the RAID operation (to correct the errors on data stored in the "bad" memory device) can involve reading parity data (that has been previously generated at the reconstruction component 106) and other data stored in the "good" memory devices 120 corresponding to the same stripe as the data stored in the "bad" memory device. An XOR of the other data read from the "good" memory devices 120 and parity data can be used to recover (e.g., correct) the data read from the "bad" memory device 120.

In some embodiments, the reconstruction component 106 can further include cyclic redundancy code (CRC) component (e.g., encoder/decoder) that can generate CRC data based on a stripe generated at the reconstruction component 106 and decode the CRC data transferred from each memory device 120. To provide check-and-recover correction, the CRC component can operate on data in conjunction with the RAID component (e.g., the RAID component 214 illustrated in FIG. 2) of the reconstruction component 106 that is specifically designed for providing RAID capability. More specifically, the CRC component can detect an error in data (e.g., transferred from each memory device 120) and the RAID component can recover the data in response.

In another example, data can be reconstructed regardless of an amount of errors within the data, but merely to execute a read command received from the host 102. For example, when a read command to access data stored in one memory device 120 is received (from the host 102) at the memory controller 104, the reconstruction component 106 determines whether to execute the read command by accessing the memory device 120 (to transfer the data from the memory device 120) or by reconstructing the data without accessing the memory device 120. This determination made by the reconstruction component 106 can be based on comparison among queue depths of command queues respectively corresponding to the memory devices 120 and/or solely based on a queue depth of a command queue corresponding to a memory device 120 storing data corresponding to a read command. Further details of how the reconstruction component 106 operates is described in connection with FIGS. 2 and 3.

Figure 2:
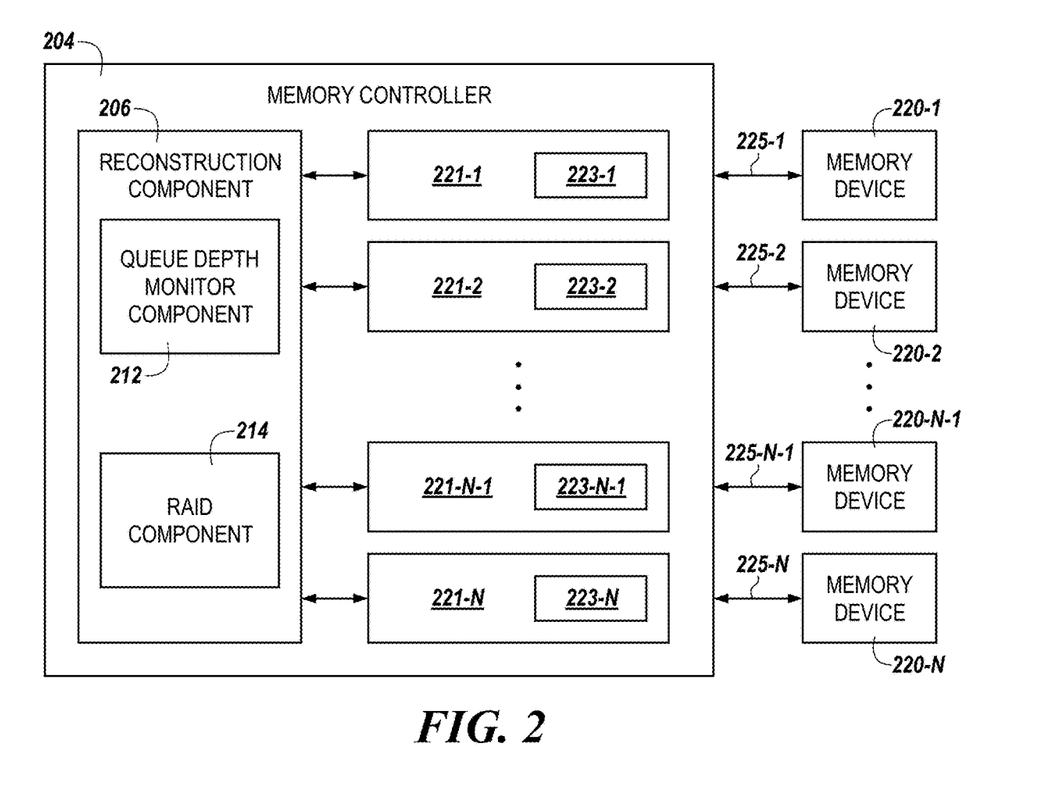
FIG. 2 is a functional block diagram of a memory controller for read replacement via data reconstruction based on access patterns in accordance with a number of embodiments of the present disclosure.

FIG. 2 is a functional block diagram of a memory controller 200 for data reconstruction based on queue depth comparison in accordance with a number of embodiments of the present disclosure. The memory controller 204 and memory devices 220 illustrated in FIG. 2 are analogous to the memory controller 104 and memory devices 120 illustrated in FIG. 1.

The media controller 221 can control performance of a memory operation directed to a corresponding channel and/or memory device 220. The access command (e.g., read or write command) received from the host (e.g., the host 102 illustrated in FIG. 1) and at the memory controller 204 can be further transferred to one or more memory devices 220. For example, the access command to access data from the memory device 220-1 can be further transferred to the media controller 221-1, which can drive the channel 225-1 to access the memory device 220-1.

The media controllers 221-1, . . . , 221-N can be used substantially contemporaneously to drive the channels 225-1, . . . , 225-N contemporaneously. In at least one embodiment, each of the media controllers 221 can receive a same command and address and drive the channels 225 substantially contemporaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that may be exhibited by various interfaces (e.g., LPDDR5 vs. PCIe), media controllers that are utilized "substantially contemporaneously" may not start or finish at exactly the same time. For example, the memory controllers can be utilized such that they are writing data to the memory devices at the same time regardless of whether one of the media controllers commences or terminates prior to the other.

The media controllers 221-1, . . . , 221-N can respectively include command queues 223-1, . . . , 223-N. The command queue 223 can operate as a buffer that temporarily store (e.g., enqueue) host commands prior to the commands being further issued to and executed at the respective memory device 220. In some embodiments, the buffer can operate according to a FIFO (first-in, first-out) policy, which cause the buffer to output commands in an order in which they were received at the buffer.

The reconstruction component 206 can include a queue depth monitor component 212 and a RAID component 214. Although not shown in FIG. 2 so as to not obfuscate the drawings, queue depth monitor component 212 and a RAID component 214 can include various circuitry to facilitate performance of operations described herein.

The command queues 223 can be communicatively coupled to the reconstruction component 206, such as a queue depth monitor component 212, which can actively (e.g., continuously) monitor and/or determine a queue depth of each command queue 223. The RAID component 214 can perform operations associated with generating RAID parity based on user data received from the host (e.g., the host 102 illustrated in FIG. 1) and/or performing a RAID operation using data (e.g., user and parity data) transferred from the memory devices 220.

In some embodiments, the reconstruction component 206 can determine whether to trigger a RAID operation to execute the host read command. As an example, consider a host read command received to access the memory device 220-1 via the channel 225-1. In one example, when the host read command is received, the reconstruction component 206 can obtain monitored queue depths of the respective command queues 223-1, . . . , 223-N and further compare a queue depth of the command queue 223-1 (corresponding to the channel 225-1 and memory device 220-1) to one of the command queues 223-2, . . . , 223-N having a greater queue depth (alternatively referred to as a "maximum" queue depth) than the other command queues of the command queues 223-2, . . . , 223-N. For example, if a queue depth of the command queue 223-N is greater than respective queue depths of the other command queues 223-2, . . . , 223-(N−1), a queue depth of the command queue 223-1 can be compared to a queue depth of the command queue 223-N.

In another example, when the host read command (to access the memory device 220-1) is received, the reconstruction component 206 can compare a queue depth of the command queue 223-1 to each one of the other queue depths of the command queues 223-2, . . . , 223-N. In some embodiments, the command queue 223-1 can be compared to each one of the other queue depths of the command queues 223-2, . . . , 223-N substantially simultaneously (alternatively referred to as "substantially contemporaneously"). In this example, one of the results of the comparison that has a greater different (e.g., a difference between two compared queue depths) than the other differences can be further compared to a threshold amount.

If a queue depth of the command queue 223-1 is greater than a queue depth of the command queue 223-N by a threshold amount (alternatively, if the difference is greater than the threshold amount), the memory controller 204 can access the other memory devices 220-2, . . . , 220-N to reconstruct the data using the data stored in the memory devices 220-2, . . . , 220-N (instead of transferring the data from the memory device 220-1 to the host). As described herein, reconstructing the data can involve causing the RAID component 214 to perform the RAID operation, which reconstructs the data using the data transferred from the memory devices 220-2, . . . , 220-N without transferring the data from the memory device 220-1. Otherwise (if a queue depth of the command queue 223-1 is not greater than a queue depth of the command queue 223-N by a threshold amount), the memory controller 204 can access the memory device 220-1 via the channel 225-1 to transfer the data to the host (e.g., the host 102 illustrated in FIG. 1).

Figure 3:
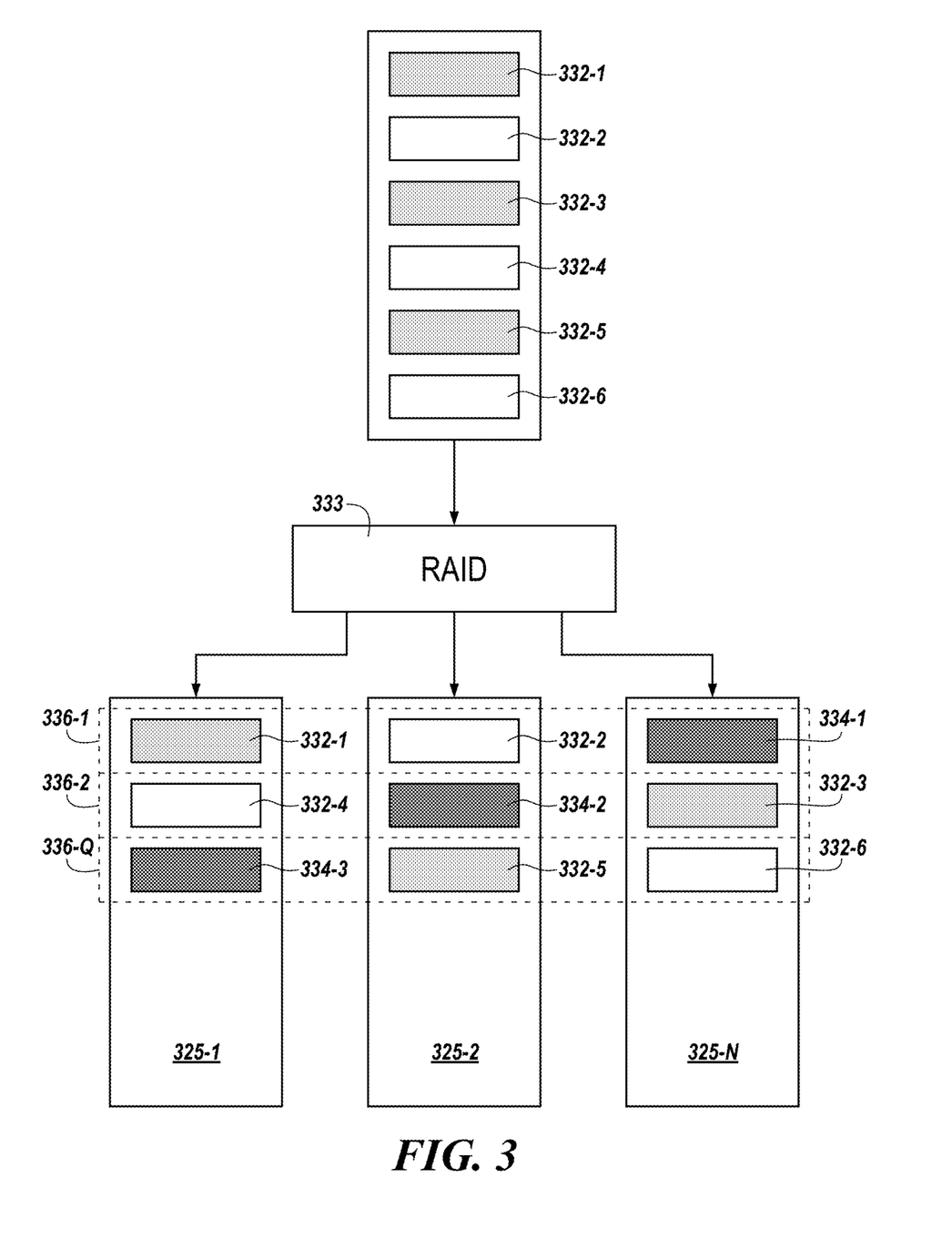
FIG. 3 illustrates how subsets of user data/parity data can be distributed over channels in accordance with a number of embodiments of the present disclosure.

FIG. 3 illustrates how subsets of user data/parity data can be distributed (e.g., spread) over channels in accordance with a number of embodiments of the present disclosure. Channels 325 illustrated in FIG. 3 are analogous to the channels 125/225 illustrated in FIGS. 1 and 2, respectively.

Subsets of user data (e.g., subsets of user data 332-1, . . . , 332-6) can respectively correspond to host commands received from the host (e.g., the host illustrated in FIG. 1) and can be distributed over channels 325-1, . . . , 325-N subsequent to a RAID process 333 ("RAID" as shown in FIG. 3). Although not explicitly illustrated in FIG. 3, the subsets 332 can be enqueued in the memory controller (e.g., the memory controller 104 and/or 204 illustrated in FIGS. 1 and 2, respectively) prior to being distributed over the channels 325. Although not explicitly illustrated in FIG. 3, the subsets 332-1, . . . , 332-6 can be enqueued in command queues (e.g., the command queues 223-1, . . . , 223-N illustrated in FIG. 2) respectively corresponding to the channels 325-1, . . . , 325-N.

The RAID process 333 illustrated in FIG. 3 can be performed at the reconstruction component (e.g., the reconstruction component 106 and/or 206 illustrated in FIGS. 1 and 2, respectively) involve generating parity data (e.g., subsets of parity data 334-1, 334-2, and/or 334-3) respectively corresponding to the subsets of user data 332 as further described herein. For example, the subsets of parity data 334-1 are generated based on the subsets of user data 332-1 and 332-2; the subsets of parity data 334-2 are generated based on the subsets of user data 332-3 and 332-4; and the subsets of parity data 334-3 are generated based on the subsets of user data 332-5 and 332-6. As illustrated herein, the RAID process 333 can be performed at the reconstruction component 106 and/or 206 (e.g., the RAID component 214 illustrated in FIG. 2) respectively illustrated in FIGS. 1 and 2.

In an example illustrated in FIG. 3, the subsets 332-1 and 332-4 are transferred to (e.g., a memory device via) a channel 325-1; the subsets 332-3 and 332-4 are transferred to (e.g., a memory device via) a channel 325-2; and the subsets 332-5 and 332-6 are transferred to (e.g., a memory device via) a channel 325-N. Although embodiments are not so limited, each subset can correspond to a size of host read and/or write commands, such as 64 bytes.

As further illustrated in FIG. 3, data corresponding to each stripe (e.g., stripe 336-1, 336-2, and/or 336-Q) are distributed over the channels 325. For example, the subsets 332-1 and 332-2 that are respectively distributed over the channels 325-1 and 325-2 can form a stripe 336-1 along with a subset of parity data 334-1 distributed to the channel 325-N; the subsets 332-3 and 332-4 that are respectively distributed over the channels 325-1 and 325-N can form a stripe 336-2 along with a subset of parity data 334-2 distributed to the channel 325-2; and the subsets 332-5 and 332-6 that are respectively distributed over the channels 325-2 and 325-3 can form a stripe 336-Q along with a subset of parity data 334-3 distributed to the channel 325-1. Stated alternatively, subsets of each stripe can be distributed over (e.g., memory devices coupled to) different channels 325 such that no more than a single subset of each stripe is distributed to each channel 325.

As illustrated in FIG. 3, the subsets of parity data 334 of the stripes 336 are distributed over different channels such that each channel 325 (e.g., a memory device coupled to each channel) is configured for no more than one subset of parity data. For example, the subset of parity data 334-1 is distributed to the channel 325-N, while the subset of parity data 334-2 is distributed to the channel 325-2 or while the subset of parity data 334-3 is distributed to the channel 325-1.

As described herein, each stripe is a unit of RAID access. For example, a RAID operation to recover and/or reconstruct the subset 332-1 can involve transferring data (e.g., the subsets 332-2 and 334-1) corresponding to the stripe to the memory controller (e.g., the memory controller 104 and/or 204 illustrated in FIGS. 1 and 2, respectively) such that the subset 332-1 can be reconstructed using the subsets 332-2 and 334-1; a RAID operation to recover and/or reconstruct the subset 332-3 can involve transferring data (e.g., the subsets 332-4 and 334-2) corresponding to the stripe to the memory controller such that the subset 332-3 can be reconstructed using the subsets 332-4 and 334-2; and a RAID operation to recover and/or reconstruct the subset 332-5 can involve transferring data (e.g., the subsets 332-6 and 334-3) corresponding to the stripe to the memory controller such that the subset 332-5 can be reconstructed using the subsets 332-6 and 334-3.

In a non-limiting example, an apparatus (e.g., the computing system 100 illustrated in FIG. 1) can include a plurality of memory devices (e.g., the memory devices 120 and/or 220 illustrated in FIGS. 1 and 2, respectively) and a controller (e.g., the memory controller 104 and/or 204 illustrated in FIGS. 1 and 2, respectively) communicatively coupled to the plurality of memory devices via a plurality of respective channels (e.g., the channels 125, 225, and/or 325 illustrated in FIGS. 1, 2, and 3, respectively). The controller can be configured to receive a read command to access data (e.g., the subset of user data 332-1, 332-2, 332-3, 332-4, 332-5, and/or 332-6 illustrated in FIG. 3) stored in a first memory device (e.g., the memory device 120 and/or 220 illustrated in FIGS. 1 and 2, respectively) corresponding to a first channel of the plurality of channels. The controller can be further configured to determine a difference between a first quantity of entries in a command queue (e.g., the command queue 223 illustrated in FIG. 2) corresponding to the first channel and a second quantity of entries in a number of command queues (e.g., the command queues 223 illustrated in FIG. 2) corresponding to a number of different channels of the plurality of channels (e.g., the subset of user data 332-1, 332-2, 332-3, 332-4, 332-5, and/or 332-6 illustrated in FIG. 3) stored in a memory device (e.g., the memory device 120 and/or 220 illustrated in FIGS. 1 and 2, respectively) corresponding to a second channel. The controller can be further configured to execute the read command by reconstructing the data corresponding to the read command by accessing (instead of executing the read command) data (e.g., the subset of user data 332-1, 332-2, 332-3, 332-4, 332-5, and/or 332-6 illustrated in FIG. 3) stored in memory devices (e.g., the memory devices 120 and/or 220 illustrated in FIGS. 1 and 2, respectively) corresponding to the number of different channels responsive to the difference meeting (e.g., being greater than) a threshold.

In some embodiments, the controller can be configured to trigger a redundant array of independent disks (RAID) process (e.g., the RAID process 333 illustrated in FIG. 3) to reconstruct the data corresponding to the read command. The controller can be configured to trigger the RAID process (e.g., the RAID process 333 illustrated in FIG. 3) regardless of an amount of errors in the data stored in the memory device corresponding to the first channel. Further continuing with this example, the plurality of memory devices can be configured to store a plurality of RAID stripes. In this example, a memory device corresponding to one channel of the plurality of channels can be configured to store first parity data (e.g., the subset of parity data 334-1, 334-2, and/or 334-3 illustrated in FIG. 3) corresponding to a first RAID stripe of the plurality of RAID stripes, while a memory device corresponding to a different channel of the plurality of channels is configured to store second parity data (e.g., the subset of parity data 334-1, 334-2, and/or 334-3 illustrated in FIG. 3) corresponding to a second RAID stripe of the plurality of RAID stripes.

In some embodiments, the controller can be configured to reconstruct the data corresponding to the read command without accessing (e.g., transferring) the data corresponding to the read command from the first memory device. In some embodiments, the data stored in the first memory device and corresponding to the read command is part of a RAID stripe (e.g., the RAID stripe 336-1, 336-2, . . . , 336-Q illustrated in FIG. 3) that includes the data stored in the memory devices corresponding to the number of different channels.

In another non-limiting example, an apparatus (e.g., the computing system 100 illustrated in FIG. 1) can include a plurality of memory devices (e.g., the memory devices 120 and/or 220 illustrated in FIGS. 1 and 2, respectively) and a controller (e.g., the memory controller 104 and/or 204 illustrated in FIGS. 1 and 2, respectively) communicatively coupled to the plurality of memory devices via a plurality of respective channels (e.g., the channels 125, 225, and/or 325 illustrated in FIGS. 1, 2, and 3, respectively). The controller can include a plurality of command queues (e.g., the command queues 223-1, . . . , 223-N illustrated in FIG. 2) respectively corresponding to the plurality of channels. The controller can be configured to monitor respective queue depths corresponding to the plurality of command queues. The controller can be further configured to receive a read command to access data (e.g., the subset of user data 332-1, 332-2, 332-3, 332-4, 332-5, and/or 332-6 illustrated in FIG. 3) stored in a memory device corresponding to a first channel of the plurality of channels, the read command corresponding to a first stripe. The controller can be further configured to, in response to a current queue depth of a first command queue corresponding to the first channel meeting a particular criterion, read data (e.g., the subset of user data 332-1, 332-2, 332-3, 332-4, 332-5, and/or 332-6 and/or the subset of parity data 334-1, 334-2, and/or 334-3 illustrated in FIG. 3) from memory devices corresponding to a number of channels other the first channel to obtain the data corresponding to the read command instead from the memory device corresponding to the first channel. In some embodiments, the controller can be a compute express link (CXL)-compliant controller.

In some embodiments, second command queues (e.g., the command queues 223-1, . . . , 223-N illustrated in FIG. 2) respectively can correspond to remaining channels of the plurality of channels. In this example, the particular criterion can include a current queue depth of the first command queue being greater than a current queue depth of one of the second command queues by a threshold amount. Continuing with this example, the one of the second command queues has a greater queue depth than respective queue depths of the other command queues of the second command queues. Further continuing with this example, the controller can be configured to read the data corresponding to the read command from the first memory device in response to a queue depth of the first command queue not being greater than the threshold amount.

In some embodiments, the controller can be configured to read the data corresponding to the read command from the first memory device in response to a queue depth of the first command queue being greater than a queue depth of the one of the second command queues by the threshold amount. In some embodiments, the first stripe is a redundant array of independent disks (RAID) stripe (e.g., the stripe 336-1, 336-2, and/or 336-Q illustrated in FIG. 3).

In some embodiments, a first portion of each one of the plurality of memory devices can be configured to store user data (e.g., the subset of user data 332-1, 332-2, 332-3, 332-4, 332-5, and/or 332-6 illustrated in FIG. 3) corresponding to the first stripe. Further, a second portion of each one of the plurality of memory devices can be configured to store parity data (e.g., the subset of parity data 334-1, 334-2, and/or 334-3 illustrated in FIG. 3) corresponding to the first stripe. Continuing with this example, the controller can be configured to access, to perform a redundant array of independent disks (RAID) operation to reconstruct the data corresponding to the read command, the respective user data stored in each memory device of the first portion and corresponding to the first stripe and the respective parity data stored in each memory device of the second portion and corresponding to the first stripe.

Figure 4:
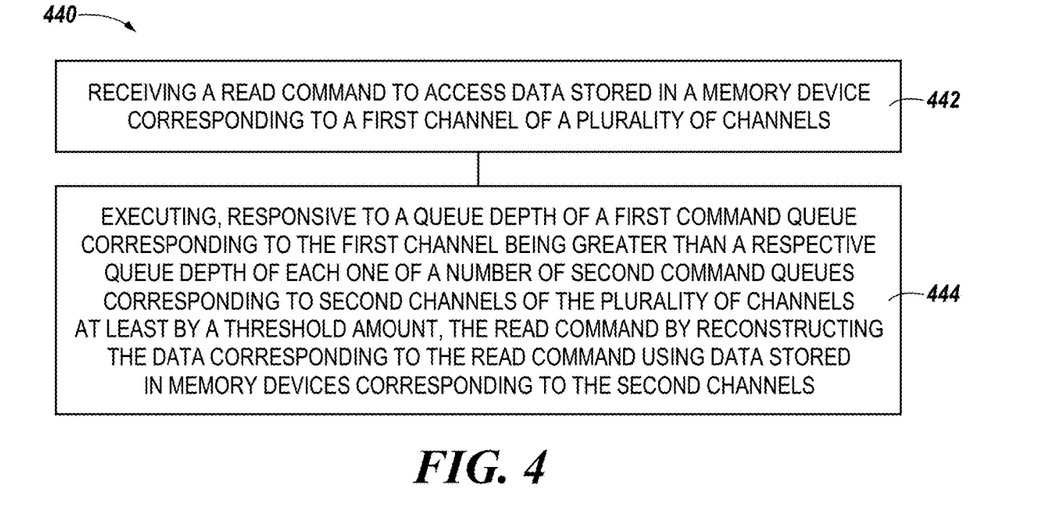
FIG. 4 is a flow diagram representing an example method for read replacement via data reconstruction based on access patterns in accordance with a number of embodiments of the present disclosure.

FIG. 4 is a flow diagram representing an example method 440 for data reconstruction based on queue depth comparison in accordance with a number of embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the memory controller 104 and/or 204 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 442, a read command to access data (e.g., the subset of user data 332-1, 332-2, 332-3, 332-4, 332-5, and/or 332-6 illustrated in FIG. 3) stored in a memory device (e.g., the memory devices 120 and/or 220 illustrated in FIGS. 1 and 2, respectively) corresponding to a first channel of a plurality of channels (e.g., the channels 125, 225, and/or 325 illustrated in FIGS. 1, 2, and 3, respectively) can be received. At 444, responsive to a queue depth of a first command queue (e.g., the command queue 223-1, . . . , 223-N illustrated in FIG. 2) corresponding to the first channel being greater than a respective queue depth of each one of a number of second command queues (e.g., the command queues 223-1, . . . , 223-N illustrated in FIG. 2) corresponding to second channels of the plurality of channels at least by a threshold amount, the read command can be executed by reconstructing the data corresponding to the read command using data (e.g., the subset of user data 332-1, 332-2, 332-3, 332-4, 332-5, and/or 332-6 and/or the subset of parity data 334-1, 334-2, and/or 334-3 illustrated in FIG. 3) stored in memory devices (e.g., the memory devices 120 and/or 220 illustrated in FIGS. 1 and 2, respectively) corresponding to the second channels.

In some embodiments, a queue depth of the first command queue can be compared to a respective queue depth of one of the number of second command queues having a queue depth greater than remaining command queues of the number of second command queues. The data corresponding to the read command can be reconstructed using the data stored in the memory device corresponding to the second channels responsive to the queue depth of the first command queue being greater than the respective queue depth of the one of the number of second command queues at least by the threshold amount. Further in this example, the read command can be executed (responsive to the queue depth of the first command queue not being greater than the threshold amount) by reading the data corresponding to the read command from the memory device corresponding to the first channel without comparing the queue depth of the first command queue to the respective queue depth of the one of the number of second command queues.

In some embodiments, the read command can be executed by reading the data corresponding to the read command from the memory device corresponding to the first channel responsive to a queue depth of the first command queue being not greater than the respective queue depth of each one of the number of second command queues at least by the threshold amount.

In some embodiments, the data corresponding to the read command can be reconstructed using the data stored in the memory device corresponding to the second channels, by reading, from the memory device corresponding to the second channels, data (e.g., the subset of user data 332-1, 332-2, 332-3, 332-4, 332-5, and/or 332-6 illustrated in FIG. 3) corresponding to a same stripe as the data corresponding to the read command. In this example, parity data (e.g., the subset of parity data 334-1, 334-2, and/or 334-3 illustrated in FIG. 3) corresponding to the same stripe as the data corresponding to the read command can be further read from a memory device corresponding to one of the second channels.

Figure 5:
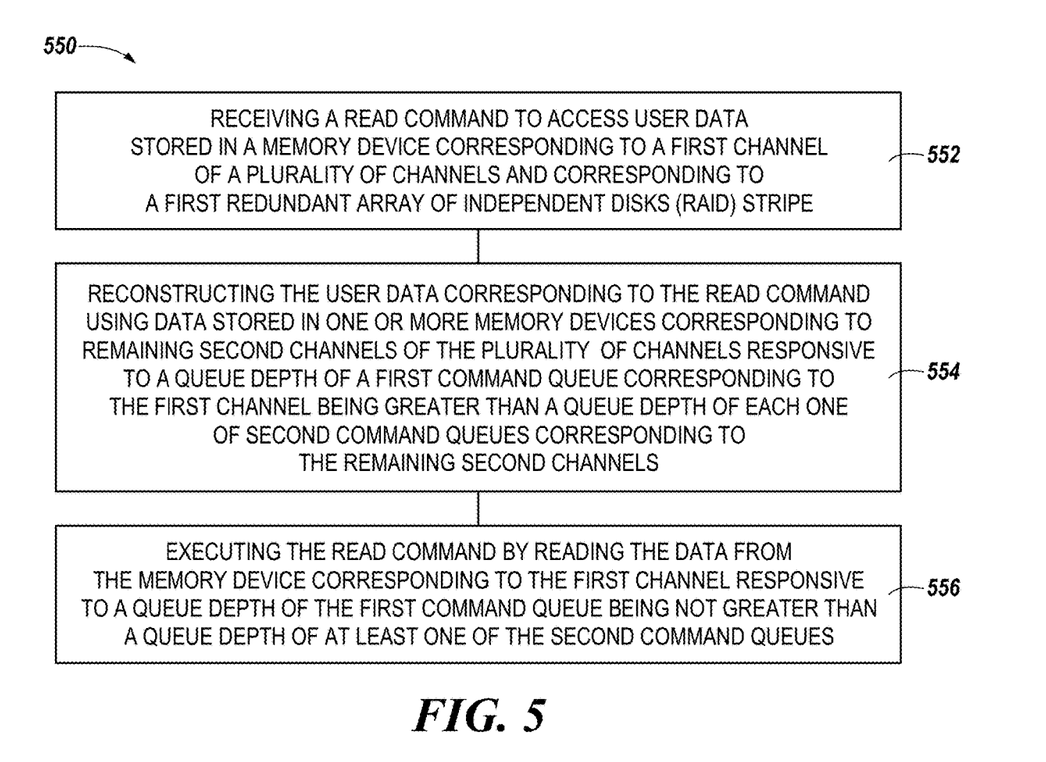
FIG. 5 is a flow diagram representing another example method for read replacement via data reconstruction based on access patterns in accordance with a number of embodiments of the present disclosure.

FIG. 5 is a flow diagram representing another example method 550 for data reconstruction based on queue depth comparison in accordance with a number of embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the memory controller 104 and/or 204 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 552, a read command can be received to access user data (e.g., the subset of user data 332-1, 332-2, 332-3, 332-4, 332-5, and/or 332-6 illustrated in FIG. 3) stored in a memory device (e.g., the memory devices 120 and/or 220 illustrated in FIGS. 1 and 2, respectively) corresponding to a first channel of a plurality of channels (e.g., the channels 125, 225, and/or 325 illustrated in FIGS. 1, 2, and 3, respectively). The user data can further correspond to a first redundant array of independent disks (RAID) stripe (e.g., the stripe 336-1, 336-2, and/or 336-Q illustrated in FIG. 3).

At 554, the user data corresponding to the read command can be reconstructed using data (e.g., the subset of user data 332-1, 332-2, 332-3, 332-4, 332-5, and/or 332-6 and/or the subset of parity data 334-1, 334-2, and/or 334-3 illustrated in FIG. 3) stored in one or more memory devices corresponding to remaining second channels of the plurality of channels. This user data can be reconstructed responsive to a queue depth of a first command queue (e.g., the command queue 223-1, . . . , 223-N illustrated in FIG. 2) corresponding to the first channel being greater than a queue depth of each one of second command queues (e.g., the command queues 223-1, . . . , 223-N illustrated in FIG. 2) corresponding to the remaining second channels. At 556, the read command can be executed by reading the data from the memory device corresponding to the first channel responsive to a queue depth of the first command queue being not greater than a queue depth of at least one of the second command queues.

In some embodiments, the user data corresponding to the read command can be reconstructed without reading the user data corresponding to the read command from the memory device corresponding to the first channel. In some embodiments, the user data corresponding to the read command can be reconstructed by reading user data (e.g., the subset of user data 332-1, 332-2, 332-3, 332-4, 332-5, and/or 332-6 illustrated in FIG. 3) corresponding to the first RAID stripe from a memory device (e.g., the memory devices 120 and/or 220 illustrated in FIGS. 1 and 2, respectively) corresponding to a first portion of the remaining second channels and reading parity data (e.g., the subset of parity data 334-1, 334-2, and/or 334-3 illustrated in FIG. 3) corresponding to the first RAID stripe from a memory device (e.g., the memory devices 120 and/or 220 illustrated in FIGS. 1 and 2, respectively) corresponding to a second portion of the remaining second channels. Further continuing with this example, the user data corresponding to the read command can be further reconstructed by performing a RAID operation using the user data and parity data read from the memory devices respectively corresponding to the first and second portions of the remaining second channels to reconstruct the user data corresponding to the read command.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a plurality of memory devices; and
a controller communicatively coupled to the plurality of memory devices via a plurality of respective channels, the controller configured to:
receive a read command to access data stored in a memory device corresponding to a first channel of the plurality of channels;
determine a difference between a first quantity of entries in a command queue corresponding to the first channel and a second quantity of entries in a number of command queues corresponding to a number of different channels of the plurality of channels; and responsive to the difference meeting a threshold, execute the read command by reconstructing the data corresponding to the read command by accessing data stored in memory devices corresponding to the number of different channels.

2. The apparatus of claim 1, wherein the controller is configured to trigger a redundant array of independent disks (RAID) process to reconstruct the data corresponding to the read command.

3. The apparatus of claim 2, wherein the controller is configured to trigger the RAID process regardless of an amount of errors in the data stored in the memory device corresponding to the first channel.

4. The apparatus of claim 2, wherein:
the plurality of memory devices are configured to store a plurality of RAID stripes; and
a memory device corresponding to one channel of the plurality of channels is configured to store first parity data corresponding to a first RAID stripe of the plurality of RAID stripes, while a memory device corresponding to a different channel of the plurality of channels is configured to store second parity data corresponding to a second RAID stripe of the plurality of RAID stripes.

5. The apparatus of claim 1, wherein the controller is configured to reconstruct the data corresponding to the read command without accessing the data corresponding to the read command from the first memory device.

6. The apparatus of claim 1, wherein the data stored in the first memory device and corresponding to the read command is part of a RAID stripe that includes the data stored in memory devices corresponding to the number of different channels.

7. A method, comprising:
receiving a read command to access data stored in a memory device corresponding to a first channel of a plurality of channels; and
executing, responsive to a queue depth of a first command queue corresponding to the first channel being greater than a respective queue depth of each one of a number of second command queues corresponding to second channels of the plurality of channels at least by a threshold amount, the read command by reconstructing the data corresponding to the read command using data stored in memory devices corresponding to the second channels.

8. The method of claim 7, further comprising:
comparing a queue depth of the first command queue to a respective queue depth of one of the number of second command queues having a queue depth greater than the other command queues of the number of second command queues;
reconstructing the data corresponding to the read command using the data stored in at least one of the memory devices corresponding to the second channels responsive to the queue depth of the first command queue being greater than the respective queue depth of the one of the number of second command queues at least by the threshold amount.

9. The method of claim 8, further comprising executing, responsive to the queue depth of the first command queue not being greater than the threshold amount, the read command by reading the data corresponding to the read command from the memory device corresponding to the first channel without comparing the queue depth of the first command queue to the respective queue depth of the one of the number of second command queues.

10. The method of claim 7, further comprising executing the read command by reading the data corresponding to the read command from the memory device corresponding to the first channel responsive to a queue depth of the first command queue being not greater than the respective queue depth of each one of the number of second command queues at least by the threshold amount.

11. The method of claim 7, wherein reconstructing the data corresponding to the read command using the data stored in at least one of the memory devices corresponding to the second channels, further comprises reading, from the memory devices corresponding to the second channels, data corresponding to a same stripe as the data corresponding to the read command.

12. The method of claim 11, further comprising reading, from a memory device corresponding to one of the second channels, parity data corresponding to the same stripe as the data corresponding to the read command.

13. An apparatus, comprising:
a plurality of memory devices; and
a controller coupled to the plurality of memory devices via a plurality of channels;
wherein the controller comprises a plurality of command queues respectively corresponding to the plurality of channels, and wherein the controller is configured to:
monitor respective queue depths corresponding to the plurality of command queues;
receive a read command to access data stored in a memory device corresponding to a first channel of the plurality of channels, the read command corresponding to a first stripe; and
in response to a current queue depth of a first command queue corresponding to the first channel meeting a particular criterion, read data from memory devices corresponding to a number of channels other than the first channel to obtain the data corresponding to the read command instead from the memory device corresponding to the first channel.

14. The apparatus of claim 13, wherein:
second command queues respectively correspond to remaining channels of the plurality of channels; and
the particular criterion includes a current queue depth of the first command queue being greater than a current queue depth of one of the second command queues by a threshold amount.

15. The apparatus of claim 14, wherein the one of the second command queues has a greater queue depth than respective queue depths of the other command queues of the second command queues.

16. The apparatus of claim 14, wherein the controller is configured to read the data corresponding to the read command from the first memory device in response to a queue depth of the first command queue being greater than a queue depth of the one of the second command queues by the threshold amount.

17. The apparatus of claim 14, wherein the controller is configured to read the data corresponding to the read command from the first memory device in response to a queue depth of the first command queue not being greater than the threshold amount.

18. The apparatus of claim 13, wherein the first stripe is a redundant array of independent disks (RAID) stripe.

19. The apparatus of claim 13, wherein:
a first portion of each one of the plurality of memory devices is configured to store user data corresponding to the first stripe; and
a second portion of each one of the plurality of memory devices is configured to store parity data corresponding to the first stripe.

20. The apparatus of claim 19, wherein the controller is configured to access, to perform a redundant array of independent disks (RAID) operation to reconstruct the data corresponding to the read command:
the respective user data stored in each memory device of the first portion and corresponding to the first stripe; and
the respective parity data stored in each memory device of the second portion and corresponding to the first stripe.

21. The apparatus of claim 13, wherein the controller is a compute express link (CXL)-compliant controller.

22. A method, comprising:
receiving a read command to access user data stored in a memory device corresponding to a first channel of a plurality of channels and corresponding to a first redundant array of independent disks (RAID) stripe;
reconstructing the user data corresponding to the read command using data stored in one or more memory devices corresponding to remaining second channels of the plurality of channels responsive to a queue depth of a first command queue corresponding to the first channel being greater than a queue depth of each one of second command queues corresponding to the remaining second channels; and
executing the read command by reading the data from the memory device corresponding to the first channel responsive to a queue depth of the first command queue being not greater than a queue depth of at least one of the second command queues.

23. The method of claim 22, wherein reconstructing the user data corresponding to the read command comprises:
reading user data corresponding to the first RAID stripe from a memory device corresponding to a first portion of the remaining second channels; and
reading parity data corresponding to the first RAID stripe from a memory device corresponding to a second portion of the remaining second channels.

24. The method of claim 23, wherein reconstructing the user data corresponding to the read command further comprises performing a RAID operation using the user data and parity data read from the memory devices respectively corresponding to the first and second portions of the remaining second channels to reconstruct the user data corresponding to the read command.

25. The method of claim 22, further comprising reconstructing the user data corresponding to the read command without reading the user data corresponding to the read command from the memory device corresponding to the first channel.

* * * * *